United States Patent
Hensgen et al.

(10) Patent No.: US 11,157,960 B2
(45) Date of Patent: Oct. 26, 2021

(54) TARGETED ADVERTISING BASED ON USER PRODUCT INFORMATION

(71) Applicant: OpenTV, Inc., San Francisco, CA (US)

(72) Inventors: Debra Hensgen, San Jose, CA (US); Antoine Burckard, Montigny-le-Bretonneux (FR)

(73) Assignee: OPENTV, INC., San Francisco, CA (US)

(*) Notice: Subject to any disclaimer, the term of this patent is extended or adjusted under 35 U.S.C. 154(b) by 447 days.

(21) Appl. No.: 14/285,429

(22) Filed: May 22, 2014

(65) Prior Publication Data

US 2015/0339722 A1    Nov. 26, 2015

(51) Int. Cl.
| | |
|---|---|
| G06Q 30/02 | (2012.01) |
| G06F 16/951 | (2019.01) |
| H04N 21/81 | (2011.01) |
| H04N 21/2668 | (2011.01) |
| H04N 21/41 | (2011.01) |
| H04N 7/025 | (2006.01) |

(52) U.S. Cl.
CPC ....... *G06Q 30/0267* (2013.01); *G06F 16/951* (2019.01); *H04N 21/2668* (2013.01); *H04N 21/4113* (2013.01); *H04N 21/812* (2013.01); *H04N 21/8126* (2013.01); *H04N 7/025* (2013.01); *H04N 21/4131* (2013.01)

(58) Field of Classification Search
CPC .......... G06Q 30/0251; G06Q 30/0267; G06Q 30/0264; G06Q 30/0269; G06F 3/00; G06F 16/951; H04N 21/2668; H04N 21/4113; H04N 21/812; H04N 21/8126; H04N 21/4131; H04N 7/025
See application file for complete search history.

(56) References Cited

U.S. PATENT DOCUMENTS

| | | | |
|---|---|---|---|
| 6,134,532 A | 10/2000 | Lazarus et al. | |
| 6,230,199 B1* | 5/2001 | Revashetti | G06Q 10/087 |
| | | | 705/14.66 |
| 6,334,109 B1 | 12/2001 | Kanevsky et al. | |
| 6,850,252 B1* | 2/2005 | Hoffberg | G06K 9/00369 |
| | | | 348/E7.061 |

(Continued)

FOREIGN PATENT DOCUMENTS

| | | |
|---|---|---|
| CN | 100428763 C | 10/2008 |
| CN | 101277377 A | 10/2008 |

(Continued)

OTHER PUBLICATIONS

"International Application Serial No. PCT/US2015/32056, International Search Report dated Aug. 18, 2015", 2 pgs.

(Continued)

*Primary Examiner* — David J Stoltenberg
*Assistant Examiner* — Robert C Johnson
(74) *Attorney, Agent, or Firm* — Schwegman Lundberg & Woessner, P.A.

(57) ABSTRACT

Methods and systems of targeting advertising are presented. In an example method, a media content device of a user accesses user product information originating from a user product and describing at least one characteristic of the user product. At least one advertisement is selected from a plurality of available advertisements based on the user product information. The selected advertisement is forwarded from the media content device for presentation to the user.

19 Claims, 8 Drawing Sheets

(56) References Cited

U.S. PATENT DOCUMENTS

| | | | | |
|---|---|---|---|---|
| D510,618 S | * | 10/2005 | Dooley | D23/335 |
| 8,150,729 B2 | * | 4/2012 | Wilhelm | G06Q 20/40 |
| | | | | 705/14.1 |
| 9,305,305 B2 | | 4/2016 | Dolph et al. | |
| 9,485,231 B1 | * | 11/2016 | Reese | H04L 63/061 |
| 2003/0233436 A1 | * | 12/2003 | Slemmer | H04L 12/2803 |
| | | | | 709/223 |
| 2004/0093379 A1 | * | 5/2004 | Roh | F25D 29/00 |
| | | | | 709/203 |
| 2004/0226034 A1 | * | 11/2004 | Kaczowka | H04N 5/76 |
| | | | | 725/9 |
| 2007/0021964 A1 | * | 1/2007 | Maenishi | G06K 7/0008 |
| | | | | 705/303 |
| 2007/0043847 A1 | | 2/2007 | Carter et al. | |
| 2008/0109843 A1 | * | 5/2008 | Ullah | G06Q 30/0276 |
| | | | | 725/34 |
| 2008/0259906 A1 | | 10/2008 | Shkedi | |
| 2009/0276313 A1 | | 11/2009 | Wilhelm | |
| 2010/0023965 A1 | | 1/2010 | Malik | |
| 2010/0268595 A1 | * | 10/2010 | Littrell | G06Q 30/0251 |
| | | | | 705/14.49 |
| 2011/0063126 A1 | * | 3/2011 | Kennedy | H04L 12/14 |
| | | | | 340/870.02 |
| 2012/0226764 A1 | * | 9/2012 | Philip | H04L 67/125 |
| | | | | 709/208 |
| 2012/0316984 A1 | * | 12/2012 | Glassman | G06Q 10/06 |
| | | | | 705/26.7 |
| 2013/0036061 A1 | * | 2/2013 | Alexander | G06Q 30/014 |
| | | | | 705/303 |
| 2013/0065510 A1 | * | 3/2013 | Laporte | H04W 48/18 |
| | | | | 455/7 |
| 2013/0150108 A1 | * | 6/2013 | Yang | H04W 76/14 |
| | | | | 455/509 |
| 2013/0247117 A1 | * | 9/2013 | Yamada | G08C 17/02 |
| | | | | 725/93 |
| 2013/0307702 A1 | * | 11/2013 | Pal | A47L 15/0047 |
| | | | | 340/870.02 |
| 2014/0006150 A1 | * | 1/2014 | Thompson | G06Q 30/0251 |
| | | | | 705/14.53 |
| 2014/0006953 A1 | * | 1/2014 | Kim | H04M 1/72415 |
| | | | | 715/727 |
| 2014/0027645 A1 | * | 1/2014 | Filson | G06F 1/3231 |
| | | | | 250/349 |
| 2014/0165094 A1 | * | 6/2014 | Hardy | H04N 21/41407 |
| | | | | 725/34 |
| 2014/0201315 A1 | * | 7/2014 | Jacob | G08B 25/08 |
| | | | | 709/217 |
| 2014/0244768 A1 | * | 8/2014 | Shuman | H04W 4/70 |
| | | | | 709/206 |
| 2015/0006719 A1 | * | 1/2015 | Gupta | H04L 67/16 |
| | | | | 709/224 |
| 2015/0032505 A1 | * | 1/2015 | Kusukame | G06Q 30/0255 |
| | | | | 705/7.31 |
| 2017/0193566 A1 | * | 7/2017 | Lucash | G06F 3/0485 |
| 2018/0253733 A1 | * | 9/2018 | Lewis | H04L 51/10 |
| 2021/0027237 A1 | * | 1/2021 | Klish | G06F 3/04845 |

FOREIGN PATENT DOCUMENTS

| | | |
|---|---|---|
| CN | 101895668 A | 11/2010 |
| CN | 102802049 A | 11/2012 |
| EP | 3146714 | 3/2017 |
| KR | 1020060024093 A | 3/2006 |
| KR | 1020110092584 A | 8/2011 |
| WO | WO-2007078757 A2 | 7/2007 |
| WO | WO-2015179699 A1 | 11/2015 |

OTHER PUBLICATIONS

"International Application Serial No. PCT/US2015/32056, Written Opinion dated Aug. 18, 2015", 5 pgs.

"International Application Serial No. PCT/US2015/032056, International Preliminary Report on Patentability dated Dec. 1, 2016", 7 pgs.

"European Application Serial No. 15796766.2, Response to Communication pursuant to Rules 161(2) and 162 EPC dated Jun. 20, 2017", 9 pgs.

"Singapore Application Serial No. 11201609385P, Written Opinion dated Sep. 29, 2017", 5 pgs.

"European Application Serial No. 15796766.2, Extended European Search Report dated Jan. 19, 2018", 9 pgs.

"Video Ad Serving Template (VAST 3.0)", [Online]. Retrieved from the Internet: <https://www.iabaustralia.com.au/guidelines-and-best-practice/guidelines-best-practice/item/3-guidelines-and-best-practice/36-video-ad-serving-template-vast-3-0-guidelines>, (Jun. 16, 2013).

"European Application Serial No. 15796766.2, Response filed Jun. 7, 2018 to Extended European Search Report dated Jan. 19, 2018", 40 pgs.

"Australian Application Serial No. 2015264013, First Examination Report dated Apr. 3, 2019", 4 pgs.

"Chinese Application Serial No. 201580026702.X, Office Action dated Jan. 4, 2019", With English Translation, 30 pgs.

"Chinese Application Serial No. 201580026702.X, Office Action dated Jul. 18, 2019", With English Translation, 13 pgs.

"Chinese Application Serial No. 201580026702.X, Response filed May 20, 2019 to Office Action dated Jan. 4, 2019", With English Claims, 76 pgs.

"Singapore Application Serial No. 11201609385P, response filed Jan. 15, 2019 to Written Opinion dated Sep. 4, 2018", With English Translation, 27 Pgs.

"Chinese Application Serial No. 201580026702.X, Decision of Rejection dated Nov. 4, 2019", With English Summary, 7 pgs.

"Singapore Application Serial No. 11201609385P, Written Opinion dated Oct. 17, 2019", 6 pgs.

"Brazilian Application Serial No. BR1120160273990 Response filed Nov. 27, 2020 to, Office Action dated Aug. 24, 2020", with English claims, 57 pages.

"Chinese Application Serial No. 201580026702.X, Response filed Nov. 4, 2020 to Notice of Reexamination dated Aug. 18, 2020", with English claims, 11 pages.

"Indian Application Serial No. 201617043730, First Examination Report dated Jul. 21, 2020", with English translation, 7 pages.

"Indian Application Serial No. 201617043730, Response filed Jan. 19, 2021 to First Examination Report dated Jul. 21, 2020", 10 pages.

"Chinese Application Serial No. 201580026702.X, Response filed Sep. 27, 2019 to Office Action dated Jul. 18, 2019", with English claims, 73 pages.

"Chinese Application Serial No. 201580026702.X, Response filed Feb. 14, 2020 to Decision of Rejection dated Nov. 4, 2019", with English claims, 12 pages.

"Australian Application Serial No. 2015264013, Response filed Mar. 13, 2020 to First Examination Report dated Apr. 3, 2019", 24 pgs.

"Singapore Application Serial No. 11201609385P, Response filed Mar. 17, 2020 to Written Opinion dated Oct. 17, 2019", 16 pgs.

"Australian Application Serial No. 2015264013, Subsequent Examiners Report dated Mar. 31, 2020", 6 pgs.

"European Application Serial No. 15796766.2, Communication Pursuant to Article 94(3) EPC dated May 13, 2020", 6 pgs.

"European Application Serial No. 15796766.2, Response filed Jul. 14, 2020 to Communication Pursuant to Article 94(3) EPC dated May 13, 2020", 12 pgs.

"Chinese Application Serial No. 201580026702.X, Notice of Reexamination dated Aug. 18, 2020", with English translation, 14 pages.

"Brazilian Application Serial No. BR1120160273990, Office Action dated Aug. 24, 2020", with English translation, 7 pages.

"Video Ad Serving Template (VAST) Version 3.0", URL:http:www.iab.net media file VASTv3.0.pdf, (Feb. 20, 2014), (Jul. 19, 2013), 71 pages.

"Mexican Application Serial No. MX a 2016 015296, Office Action dated Sep. 10, 2020", with English translation, 14 pages.

"Chinese Application Serial No. 201580026702.X, Decision of Reexamination dated Feb. 4, 2021", with machine English translation, 15 pages.

(56) References Cited

OTHER PUBLICATIONS

"Australian Application Serial No. 2020202346, First Examination Report dated Jun. 11, 2021", 5 pages.

* cited by examiner

TARGETED ADVERTISING BASED ON USER PRODUCT INFORMATION

FIELD

This application relates generally to the field of electronic communications and, in an example embodiment, to targeting of advertising based on information concerning networked devices.

BACKGROUND

Manufacturers, distributors, and retailers of products and services typically invest significantly in advertising that too often provides a relatively low return on that investment. One reason for this phenomenon is that much of the advertising is provided in a broadcast medium, such as broadcast television or radio. As a result, the advertiser possesses limited control over the target audience other than selecting particular broadcast channels, programs, days, and/or times during which the advertising may be broadcast. This return on advertising investment in such an environment is typically worse for products that are designed for, and/or marketed to, a specific group of potential customers.

The Internet has more recently become a valuable medium through which advertisers may target advertisements to particular people or groups thereof. For example, advertising related to particular products or services may be directed to particular individuals based on previous product searches performed by the individual, comments made by the individual or others in a social networking setting, and the like. Such forms of advertising may be presented within web pages subsequently accessed on various websites by the targeted individual. In at least some cases, this information garnered from individuals may also be employed in an over-the-top (OTT) audio/video environment on the Internet, in which a user may use an audio/video player to select video content items of interest, such as by way of selecting a Uniform Resource Locator (URL) associated with that content, and the player may retrieve the user-selected content for consumption by the user. In such environments, technology such as Video Ad Serving Template (VAST) may be employed to allow advertisement servers to communicate with audio/video players associated with particular individuals to insert selected advertisements at specific times in media content provided by those audio/video players.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of the embodiments disclosed herein. It will be evident, however, to one skilled in the art that the embodiments may be practiced without these specific details.

Figure 1:
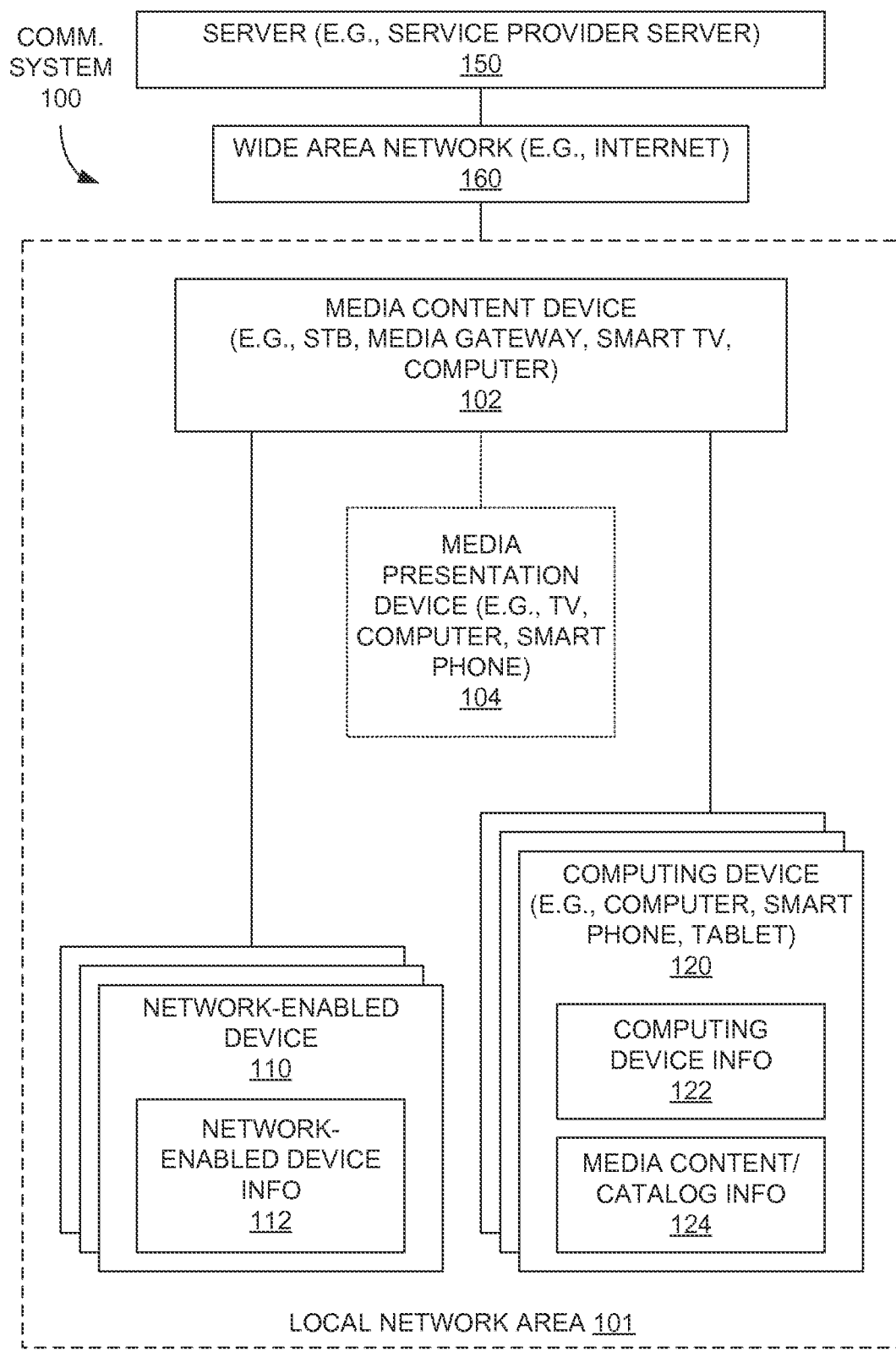
FIG. 1 is a block diagram of an example communication system employable for targeting advertising to one or more users.

FIG. 1 is a block diagram of an example communication system 100 employable for targeting advertising to one or more users. In the system 100, a local network area 101, which may be a home, apartment, small business, restaurant, bar, or other similarly localized area, may include a media content device 102 that is configured to deliver media content to one or more users located at the local network 101. In some examples, the media content device 102 may deliver media content to the user by way of a media presentation device 104, such as a television, desktop computer, laptop computer, tablet computer, gaming system, smart phone, personal digital assistant (PDA), and/or other device capable of presenting audio, video, or other media content to a user. In some examples, the media content device 102 may be a smart television, computer, or other device capable of presenting media content to a user without the use of a separate presentation device.

Accordingly, to deliver media content, the media content device 102 may also serve as or include one or more of a television set-top box (to provide content received by way of satellite antenna, cable connection, terrestrial antenna, Internet connection, and/or other communication connection to a user via a television), a local area network (LAN) router (such as an Ethernet router and/or a WiFi® router for routing communication traffic between various communication devices within the local network area 101), and/or a media gateway (such as a cable modulator/demodulator (modem), digital subscriber line (DSL) modem, or other gateway for relaying communication traffic between the local network area 101 and a wide area network (WAN) 160, such as the Internet).

The media content device 102 may also be configured to be coupled by way of one or more communication networks or other communication connections to various user electronic devices located within the local network area 101. For example, the media content device 102 may form part of a LAN with other communication or computing devices 120, such as desktop, laptop, and tablet computers; gaming systems; smart phones; PDAs; printers, and so on. As is discussed in greater detail below, one or more computing devices 120 may include or provide computing device information 122 to the media content device 102 that describes at least one characteristic of the computing device 120. This information, as described more fully below, may be employed to target advertising to at least one user of the local network area 101.

In some embodiments, the computing device 120 may also include and/or provide to the media content device 102 media content/catalog information 124 concerning media content stored within the computing device 120 or other computing devices within the local network area 101. Such media content may be owned or otherwise possessed by one or more users associated with the local network area 101. As the name indicates, the media content/catalog information 124 concerning the media content may include the media content itself (e.g., audio/video content in the form of digital versatile discs (DVDs), electronic files, and so on; audio content in the form of compact discs (CDs), electronic files, and so on; still images; electronic books; and other forms of media content in either or both physical and electronic form), and/or media content catalog information (such as, for example, content title(s), content run time(s), content creator(s), and so forth). As with the computing device information 122, the media content/catalog information 124 may be employed to target various advertising to one or more users associated with the local network area 101.

The media content device 102 may also be coupled to one or more network-enabled devices 110 that may include or otherwise provide to the media content device 102 network-enabled device information 112 that describes at least one characteristic of the associated network-enabled device 110. In some examples, the network-enabled devices 110 may include household appliances, machines, or devices, possibly including, but not limited to, clothes washers, clothes dryers, refrigerators, freezers, dishwashers, audio and other entertainment systems, healthcare systems, smoke alarm systems, security alarm systems, surveillance systems, door locks, thermostats, clocks, lights, and automotive vehicles. Such network-enabled devices 110 may be coupled with the media content device 102 via any of a number of home networks, home automation networks, wireless personal area networks (WPANs), or other communication networks, connections or protocols. Examples of such communication networks, connections, or protocols devised for a local network area 101, may include, but are not limited to, ZigBee®, BluetoothLE®, Bluetooth® Smart, Z-Wave®, 6LoWPAN (IPv6 over Low power WPAN). JenNet-IP™ (JenNet-Internet Protocol), KNX®, DECT™ ULE (Digital Enhanced Cordless Telecommunications—Ultra Low Energy), HomePlug®, HomePlug® AV/AV2, DALI; (Digital Addressable Lighting Interface), and DLNA® (Digital Living Network Alliance) as well as near field communication (NFC™), radio-frequency identification (RFID), Bluetooth®, Ethernet, and WiFi®. In one example, a unifying software framework, such as AllJoyn™, may be employed in connection with one or more of these communication technologies to retrieve and store the network-enabled device information 112 in a standardized or unified manner.

In the embodiments described below, the media content device 102, possibly in conjunction with one or more servers 150 (e.g., a server of a service provider, such as a cable television service provider, satellite television service provider, Internet service provider (ISP), and so on) communicatively coupled with the media content device 102 via the wide area network 160, may utilize any of the network-enabled device information 112, the computing device information 122, and/or the media content/catalog information 124 to determine which of a number of available advertisements (e.g., audio/video advertisements, audio advertisements, text advertisements, and the like) may be presented to one or more users located at the local network area 101. For example, by virtue of the user owning a particular type of user product, such as a network-enabled device 110 (e.g., a household appliance) or a computing device 120, or a particular item of media content, advertising for a related type of device or item of media content may be presented to the user. Consequently, advertising may be more accurately targeted to users that are more likely to respond favorably to the advertising.

Figure 2:
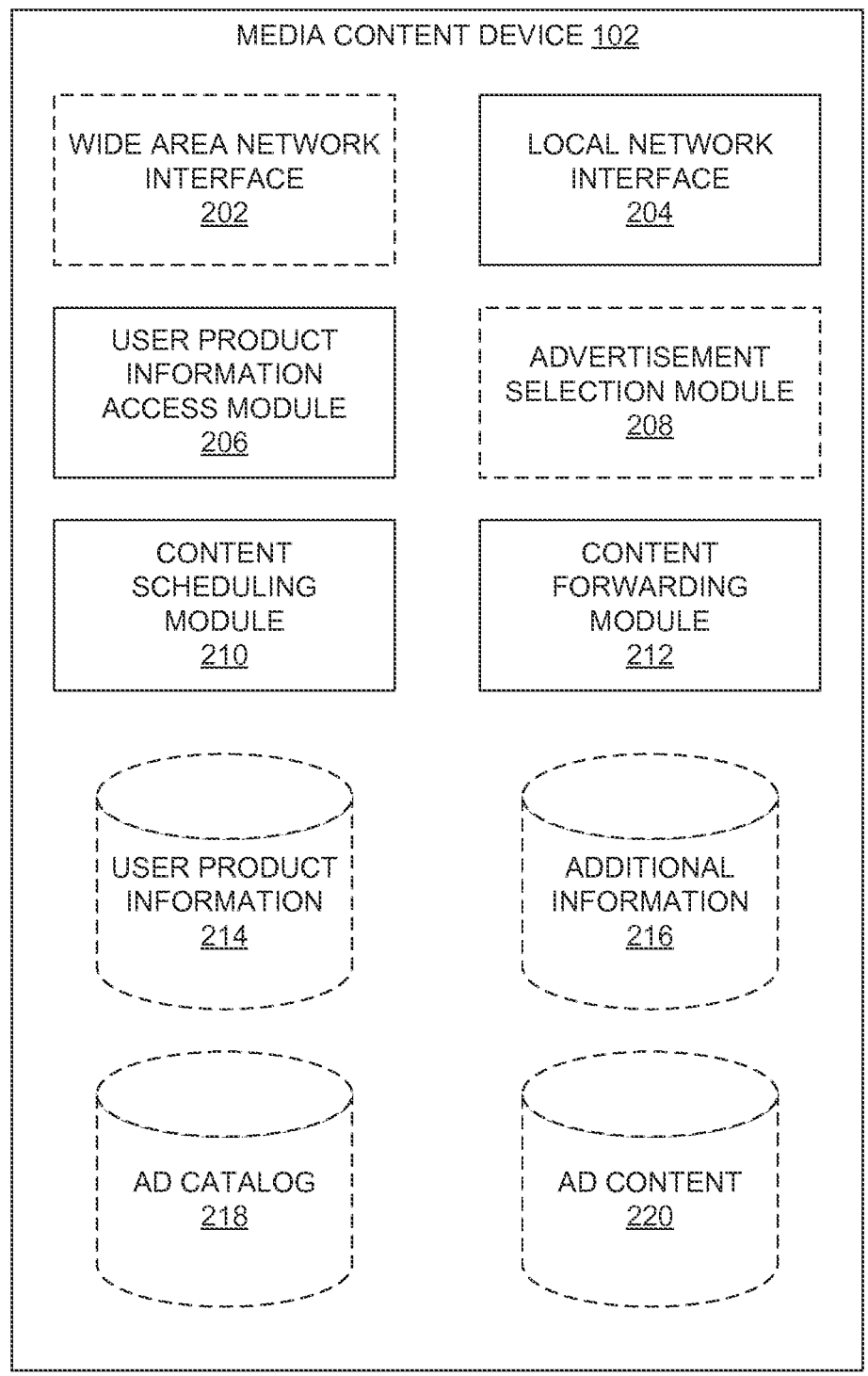
FIG. 2 is a block diagram of an example media content device employable in the communication system of FIG. 1.

FIG. 2 is a block diagram of an example of the media content device 102 employed in the communication system 100 of FIG. 1. In this example, the media content device 102 may include a wide area network interface 202, a local network interface 204, a user product information access module 206, an advertisement selection module 208, a content scheduling module 210, and a content forwarding module 212. Each of these modules, as well as other modules described herein, may include hardware, software, or some combination thereof for performing the various functions corresponding to the module, as is described more fully below. The media content device 102 may also include one or more of user product information 214, additional information 216, an advertisement catalog 218, and advertising content 220. Other possible components, such as, for example, a user interface, one or more broadcast channel tuners, a digital video recorder (DVR), and so on, may be included in the media content device 102, but are not explicitly illustrated in FIG. 2 to simplify the following discussion.

The wide area network interface 202 may facilitate communications between the media content device 102 and the one or more servers 150 of one or more service providers. As discussed below, the media content device 102 may exchange data with the server 150 to perform operations related to the targeting of advertising to users of the local network area 101, such as, for example, the retrieval or access of user product information 214 (e.g., network-enabled device information 112, computing device information 122, and media content/catalog information 124), the selection of advertisements based on the user product information 214, and the retrieval or access of the selected advertisements. Examples of those various operations may be apportioned between the media content device 102 and the server 150. Such examples are discussed hereinafter in relation to FIGS. 5, 6, and 7. In some embodiments, the wide area network interface 202 may serve as a media gateway, mentioned earlier, either within or external to the media content device 102.

The local network interface 204 may be configured to facilitate communication between the media content device 102 and one or more of the network-enabled devices 110 and the computing devices 120 of FIG. 1. Accordingly, the local network interface 204 may be capable of communicating via any one or more of Ethernet, WiFi®, NFC™, RFID, HomePlug®, ZigBee®, and other communication networks, connections, or protocols. In some examples, the local network interface 204 may serve as a LAN router, thus operating as a communication node through which the network-enabled devices 110 and the computing devices 120 may communicate within the local network area 101. In other examples, the media content device 102 may be communicatively coupled with an external LAN router to facilitate communication among the media content device 102, the network-enabled devices 110, and the computing devices 120.

The user product information access module 206, using the local network interface 204, may access any or all of the network-enabled device information 112, the computing device information 122, and the media content/catalog information 124 of FIG. 1. Such information may serve as user product information 214 that describes at least one characteristic of the associated user products (e.g., the network-enabled devices 110, computing devices 120, and media content items located in the local network area 101 that are owned and/or otherwise associated with one or more users.) In at least some examples, the user product information access module 206 may access the user product information from the particular user product or device associated with that information. In other examples, at least some of the user product information may be collected in catalogs or other repositories in devices that are different from those that the information describe, or from those that store the user product (e.g., media content items, such as songs and movies). The media content device 102 may retrieve or access this user product information from various devices and store the user product information as user product information 214 within the media content device 102 in some examples. In other embodiments, the media content device 102 may retrieve the user product information and then store the information externally at a storage component with the local network area 101, or deliver the user product information, or some indication of that information, to the server 150 via the wide area network 160.

The user product information 214 may reflect many different types of content and formats. For media content items, the user product information 214 may include, for example, a title of the item, cast and crew names associated with the item, author/performer names associated with the item, one or more publication dates associated with the item, run times of the item, a genre associated with the item, and so on. Concerning network-enabled devices 110 (such as, for example, home appliances) and computing devices 120, the user product information 214 may include a model name and/or number of the user product, a serial number of the user product, an age of the user product, a manufacturer of the user product, a current and/or former operational state of the user product, a status log of the user product, and the like.

The advertisement selection module 208 may be configured to select one or more available advertisements from a plurality of available advertisements based on the user product information 214. In some embodiments, given the type of user products the user already possesses at the local network area 101, the advertisement selection module 208 may select advertisements for products that may replace or upgrade the current user products, complement the current user products (e.g., accessories or matching products), or are connected with the current user products in some way. For example, if a current user product reflected in the user product information 214 may be an older product or model that is likely to be in need of replacement, or is a product that is experiencing problems (e.g., as indicated by errors noted in a status log), the advertisement selection module 208 may select advertisements for products that may serve as a replacement for the current user product. In other examples, the advertisement selection module 208 may select an advertisement for a repair service that is capable of repairing the current user product. If, instead, the user product is not in need or servicing or replacement, the advertisement selection module 208 may select an advertisement for a matching product (e.g., a matching clothes dryer for a clothes washer currently located at the local network area 101) or a complementary product (e.g., detergent or fabric softener recommended by the manufacturer of the clothes washer current located at the local network area 101). In some cases, the user product information 214 may include information about whether a particular consumable item (e.g., a refrigerator water filter, a printer cartridge, or the like) is in need of the replacement, thus possibly causing the advertisement selection module 208 to select an advertisement for an appropriate replacement product. Many other possibilities regarding advertisements for replacement or complementary products of currently-possessed user products are possible.

In some embodiments, other types of advertisements other than those promoting the purchase of replacement, upgrade, or complementary products are also possible. For example, the advertisement selection module 208 may select advertisements that advise users on the recommended use of products already owned, warnings and recalls involving products already owned, and so on. For example, the advertisement selection module 208 may select an advertisement announcing a recall of the particular type of dishwasher currently owned by the user, or an advertisement that reminds the user that running the dishwasher when full reduces the number of dishwashing cycles per unit time, thus saving water, reduces the amount dishwasher detergent used, and reduces wear and tear on the dishwasher.

In some examples, the advertisement selection module 208 may employ user product information 214 corresponding to two or more user products to select at least one advertisement from the available advertisements for presentation to the user. For example, the existence of two or more different user products at the local network area 101, such as a clothes washer and a clothes dryer, in which the models of the washer and dryer do not match, may cause the selection of an advertisement for a new washer that matches the dryer, and/or vice-versa.

In addition to the user product information 214, the advertisement selection module 208 may employ additional information 216 relating to, for example, the user and/or the user's environment (e.g., demographic information, geographic information, social network information, search engine information, and so on), current news events, and other information or data, to select an advertisement of potential interest to the user. For example, if the user lives in a particular geographic area, such as a cold-weather state, the advertisement selection module 208 may select an advertisement for cold-weather accessories (e.g., snow tires) selected for the user's particular vehicle during the winter months, or an advertisement for a radiator flush service.

In another example, if the current outside temperature at the location of the local network area 101 is higher than normal during a summer day, and information from an air conditioner and/or a thermostat in the local network area 101 indicates that the air conditioner is operating for an inordinately high percentage of time throughout the day, the advertisement selection module 208 may select an advertisement that provides recommendations regarding more efficient use of the air conditioner, such as, for example, closing shades to block sunlight from entering the home, running a ceiling fan to more efficiently circulate the air within the home, checking to ensure that the filter for the air conditioner does not need replacing, and so on. In another example, a weather forecast indicating an exceptionally warm day may cause the advertisement selection module 208 to forewarn the user to adjust the thermostat of the air conditioner to prevent a possible overload of the power grid supplying power to the local area. Many other examples of employing additional information 216 in conjunction with user product information 214 for advertisement selection also exist.

To use both the user product information 214 and additional information 216 to select one or more advertisements, the advertisement selection module 208 may process the user product information 214 and the additional information 216 using weighted sums, decision rules, constraints, and/or any other method of combining or aggregating multiple input values to determine a particular output value that may then be used to select one or more advertisements for presentation to the user. In some examples, these values may be matched against expected values that would indicate whether a particular advertisement should be selected for presentation. Also, based on the output values, a plurality of the available advertisements may be ranked, wherein one or more of the available advertisements may be selected for presentation to the user based on their corresponding rankings. Any other method of processing multiple inputs represented by the user product information 214 and the additional information 216 to select one or more advertisements for presentation may be used in other embodiments.

With respect to media content items owned or possessed by a user associated with the local network area 101, the advertisement selection module 208 may also use the media content/catalog information 124 of FIG. 1, stored as user product information 214 in FIG. 2, to select one or more available advertisements for presentation to the user. For example, if the media content/catalog information 124 indicates that the user owns a significant number of classical music pieces by a specific composer, the advertisement selection module 208 may select advertisements promoting other classical music by the same composer, or by a different composer whose music is often thought of as being similar to the composer reflected in the media content/catalog information 124.

In another example, the media content/catalog information 124 may indicate the particular format in which the content is stored (e.g., DVD versus Ultraviolet™, hardcover versus Kindle™, and so on). Consequently, the advertisement selection module 208 may employ this information to select an advertisement that informs the user that another format for the same content is available.

In other embodiments, additional information 216, such as geographic information, demographic information, social network information, search information, and so on, as mentioned above, may be combined or aggregated with the media content/catalog information 124 to select one or more available advertisements, such as by weighted sums, decision rules, constraints, and/or any other method of combining or aggregating multiple inputs to yield an output that may be used to select one or more advertisements, as described above. Further, the advertisement selection module 208 may rank the various available advertisements using the generated output to select one or more advertisements for presentation to the user based on the advertisement rankings.

As is described in greater detail below, the functionality provided by the advertisement selection module 208 may instead reside completely or partially in the server 150 of FIG. 1.

Continuing with FIG. 2, the media content device 102 may also include a content scheduling module 210 configured to schedule the advertisements selected via the advertisement selection module 208 for presentation to the user. In an example, the content scheduling module 210 may schedule the selected advertisements among other media content being presented to the user. The selected advertisements may be inserted between individual content items, during one or more content items, and so on. In one example, the selected advertisements are aligned in time to be presented during times reserved for the presentation of personally-targeted advertisements. That timing may be determined by a service provider associated with the server 150, by a creator or source of the media content during which the selected advertisements are to be presented, or by another entity. In addition, the selected advertisements may be scheduled for presentation during broadcast content, such as over a traditional television broadcast system provided by way of terrestrial, cable, or satellite transmission means, or during replay of such content that has been recorded at the local network area 101. In other examples, the selected advertisement may be scheduled for presentation during media content received via the Internet or another WAN 160, such as over-the-top (OTT) content received from one or more content providers. Further, in some examples, the selected advertisement may be audio, video, still image, graphical, or textual in nature, and may be presented within a web page or other type of Internet-based or web-based content.

In some examples, the selected advertisements may be scheduled for content according to Video Ad Serving Template (VAST) data accompanying or associated with the selected advertisement. Such data may indicate, for example, an identity of the selected advertisement, an indication of how the selected advertisement should be played, and other information pertaining to the scheduling and presentation of the selected advertisements.

In yet other embodiments, the selected advertisement may be scheduled for presentation as something other than a video clip among other video content. For example, the selected advertisement may be audio, video, still image, or textual information inserted within a smart phone application (e.g., an iOS or Android™ application), a game, or another type of application executing on a computing device, such as, for example, the computing device 120.

The content forwarding module 212 may be configured to generate output signals compatible with one or more media presentation devices 104, such as, for example, a television, a computer, a smart phone, and so on, to present the selected advertisements, along with other media content, to the user. For example, the output signal may be compatible for transmission to the media presentation device 104 over a coaxial cable, a composite video connection, a component video connection, an HDMI (High-Definition Multimedia Interface) connection, an Internet Protocol (IP) connection over a LAN, or any other connection capable of forwarding the selected advertisements to the media presentation device 104 for viewing by the user.

To select and forward advertisements, the media content device 102 may include one or both of an advertisement catalog 218 and advertising content 220. In one example, the advertisement catalog 218 may include metadata that describe one or more characteristics of each of the available advertisements, such as, for example, a name or title of the advertisement, a product or service identifier associated with the advertisement, a size or running time of the advertisement, one or more keywords describing the content of the advertisement, and/or other information that the advertisement selection module 208 may compare against the user product information 214 and/or the additional information 216, or a processed version thereof, to determine whether to select the advertisement for presentation to the user, as described above.

In some embodiments, the advertisement catalog 218 may include address information, such as a Uniform Resource Locator (URL) for one or advertisements, instead of the actual advertisement. For example, if a particular advertisement is selected, and that advertisement is represented by a URL in the advertisement catalog 218 or the advertising content 220, the media content device 102 may retrieve the actual advertisement from the server 150 or another system via the URL and store the retrieved advertisement as advertising content 220, which may be scheduled for presentation to the user.

Figure 3:
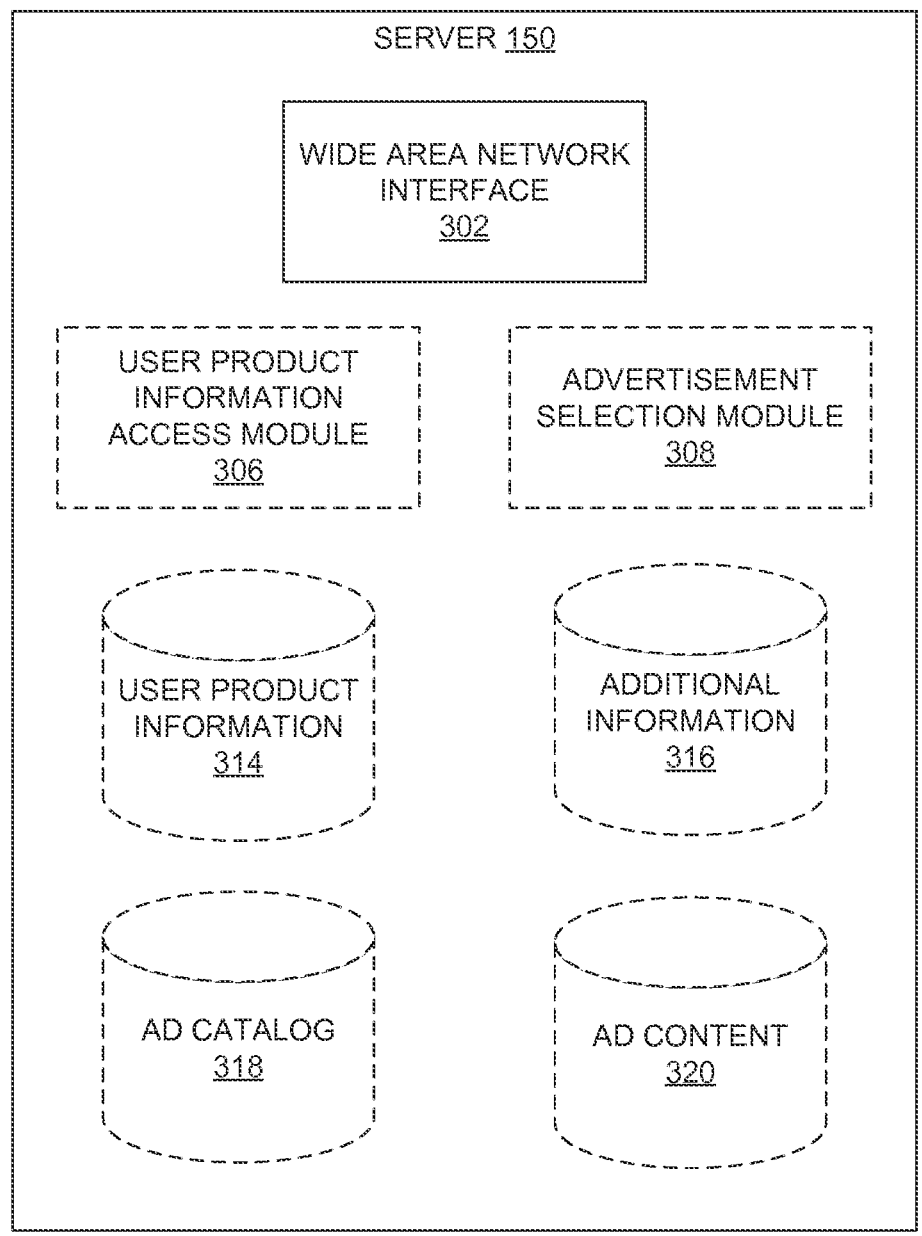
FIG. 3 is a block diagram of an example server employable in the communication system of FIG. 1.

The advertising content 220 may include the actual advertisements selected for presentation, and possibly others of the available advertisements not selected for presentation to the user. For example, the media content device 102 may receive the advertisements from the server 150 or another system by way of the wide area network 160 and the wide area network interface 202 and store the advertisements in the advertising content 220 for possibly presentation to the user, if selected by the advertisement selection module 208. In another example, a content provider may push such advertisements to the media content device 102 by way of a broadcast connection, such as, for example, a cable television connection, a satellite television connection, or a terrestrial broadcast television connection over which television programming is typically received. FIG. 3 is a block diagram of an example server 150 employable in the communication system 100 of FIG. 1. In the example of FIG. 3, the server 150 may include a wide area network (WAN) interface 302, a user product information access module 306, and/or an advertisement selection module 308. The server 150 may also include any of a number of databases or information stores, such as user product information 314, additional information 316, an advertisement catalog, and/or advertising content 320. The functionality of each of these modules of the server 150 may be similar to the corresponding modules of the media content device 102 of FIG. 2, as described above. Accordingly, the server 150 may operate in conjunction with the media content device 102 to select advertisements for presentation to the user based on user product information corresponding to the user.

For example, the server 150 may receive the user product information 314, as well as the additional information 316, from the media content device 102 via the wide area network interface 302, and store that information internally, or at a storage device external to the server 150. The advertisement selection module 308 may then select advertisements intended for the user based on the received user product information 314, and possibly the additional information 316. The selection of the advertisements may be performed using the advertisement catalog 318 and/or the advertisement content 320. The selected advertisements, or some indication thereof, may then be transferred from the advertisement content 320 via the WAN interface 302 and the WAN 160 to the media content device 102 for presentation to the user. In other examples, the server 150 may facilitate either the selection or the delivery of the advertisements.

Figure 4:
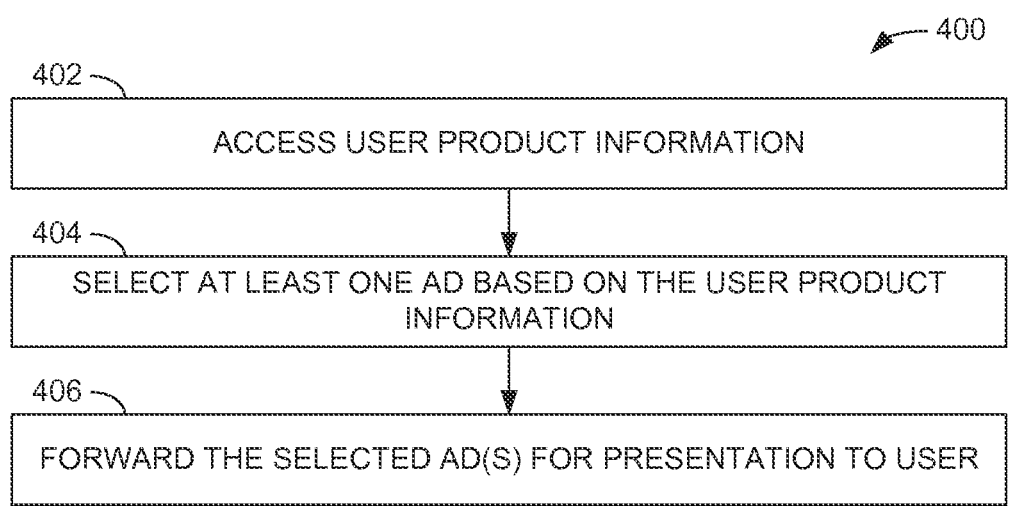
FIG. 4 is a flow diagram of an example method of employing user product information to target advertising to one or more users.

FIG. 4 is a flow diagram of an example method 400 of using product information to target advertising to one or more users. In the following examples, the media content device 102, the server 150, or both, including the various components provided therein, is presumed to perform the various operations of the method 400. However, other devices or components not specifically described herein may perform the operations of the method 400 in other embodiments.

In the method 400, user product information may be accessed (operation 402). At least one advertisement may be selected based on the user product information (operation 404). In some examples, additional information regarding the user, such as geographic, demographic, search, and social network information associated with the user, may also be utilized with the user product information to select the advertisement. The selected advertisements may be forwarded for presentation to the user (operation 406).

While the operations 402 through 406 of FIG. 4 (as well as the operations of other methods illustrated herein) are shown as occurring in a specific order, other orders of operation, including concurrent execution of two or more operations, are also possible. For example, each operation of the accessing of user product information (operation 402), the selection of advertisements (operation 404) and the forwarding of the selected advertisements for presentation (operation 406) may occur periodically, continually, or in some other repetitive manner, possibly in a parallel, simultaneous, or concurrent fashion. Further, each of the operations 402-406 may be performed for each of multiple users using one or more media content devices 102 and/or servers 150 in at least some embodiments.

Figure 5:
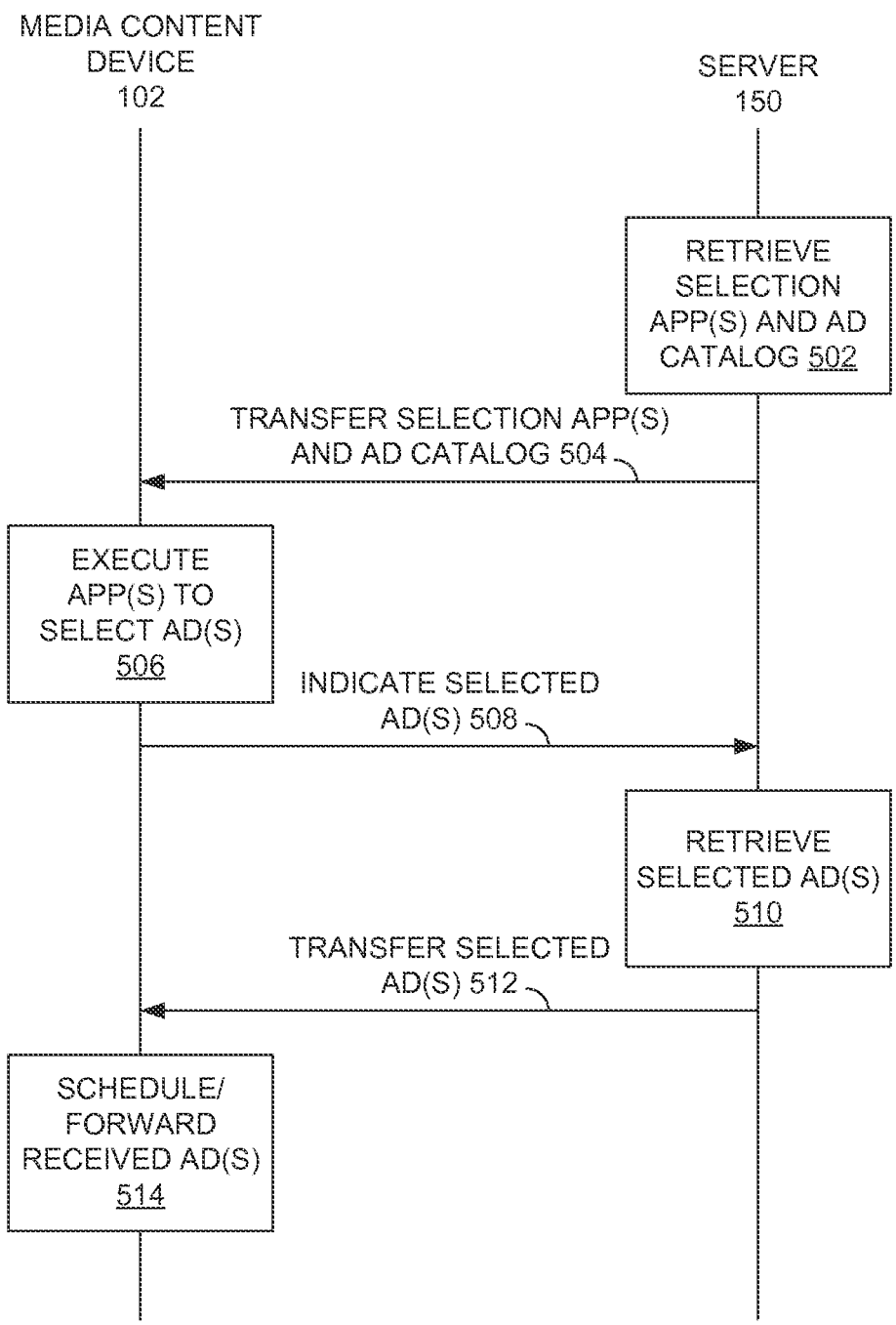
FIGS. 5 through 7 are flow diagrams of example communications between the media content device and the server of FIG. 1 for the targeting of advertising to one or more users.
Figure 6:
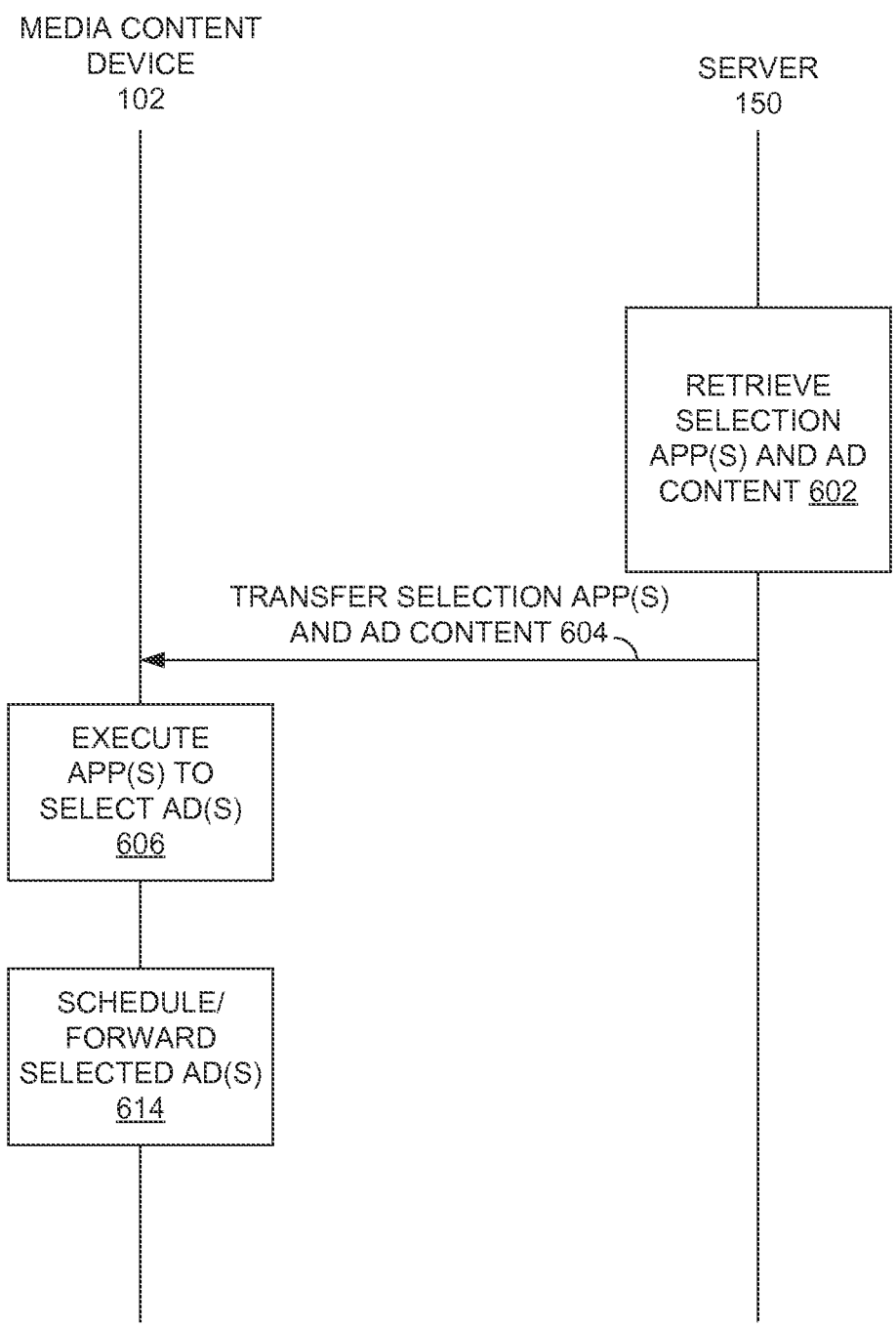
Figure 7:
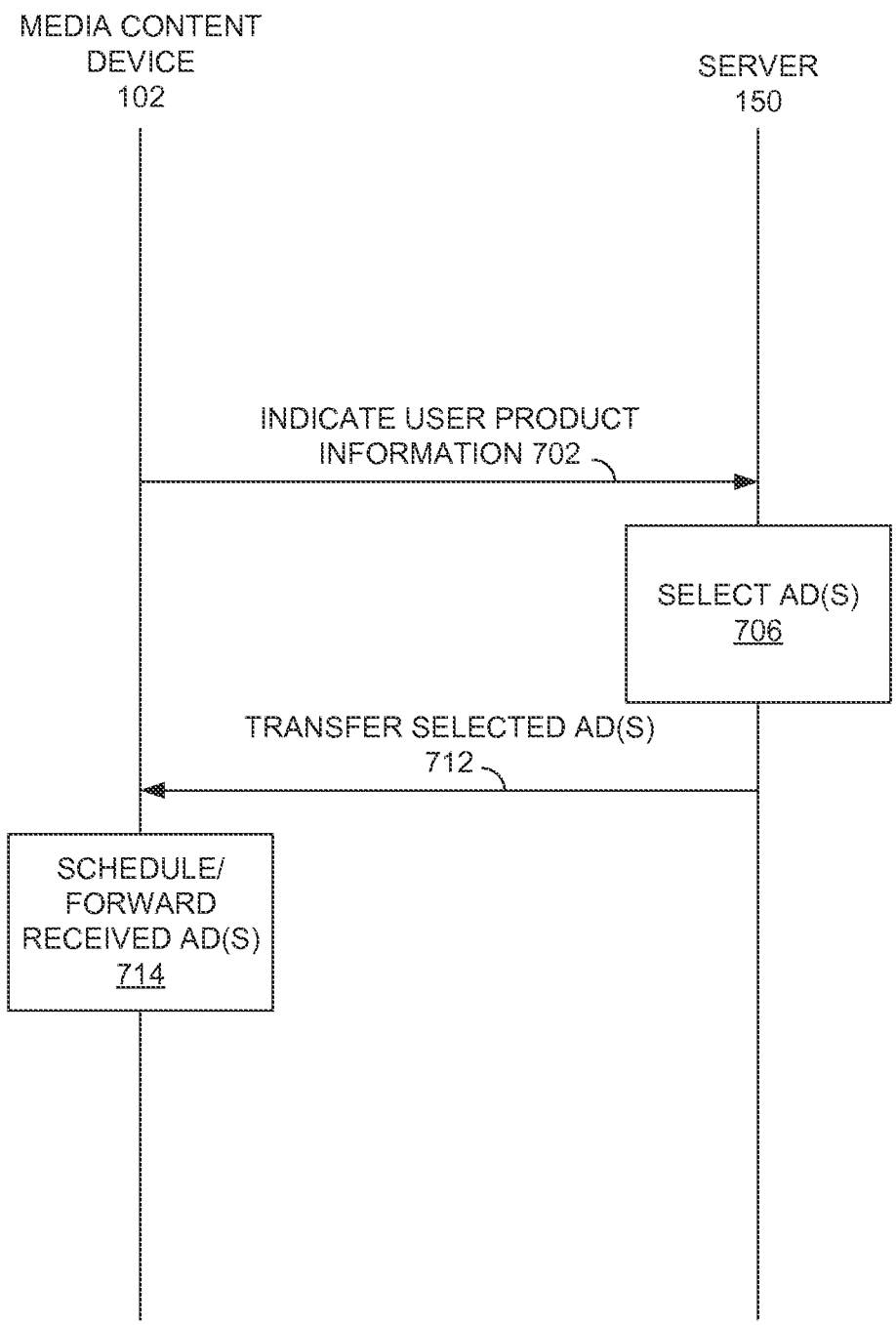

FIGS. 5 through 7 are flow diagrams of example communications between the media content device 102 and the server 150 of FIG. 1 for the targeting of advertising to one or more users. Generally, as shown in FIG. 5, the media content device 102 performs the selection of advertising, and the server 150 provides both the logic for the selection process and the selected advertisements. More specifically, the server 150 may retrieve one or more selection applications, and possibly an advertising catalog 218 (operation 502), and may transfer those applications and the catalog to the media content device 102 (operation 504), such as by way of the WAN 160 of FIG. 1. In some embodiments, the advertising catalog 218 may include address information, such as URLs, useful for the retrieval of one or more of the available advertisements. The media content device 102 may then execute one or more of the selection applications (operation 506) to select one or more advertisements from the advertisement catalog 218 received from the server 150.

In some examples, the selection applications may be applets, scripts, or other segments of software executable within the media content device 102 that perform the selection of the advertisements based on user product information 214 that is accessible at the media content device 102. In a further example, each of the selection applications may be generated or otherwise provided by an advertiser, wherein a selection application from a particular advertiser is designed to select one or more of the advertisements provided by that advertiser for a user based on user product information 214 associated with that user. In one example, the selection application may serve or operate as a device profile, wherein the device profile is compared against the user product information 214 to determine whether the user product information 214 corresponds to the device profile. Additionally, the service provider associated with the server 150 may charge the advertiser based on the number of selected advertisements, the number of users receiving the selected advertisements, and/or some other metric, thus potentially allocating the advertising costs of the advertiser more efficiently by more specifically directing advertisements to users that may be more receptive to those advertisements. In other examples, the media content device 102 may include logic employed to select advertisements without the explicit downloading of selection applications from the server 150.

In some embodiments, the use of the selection applications by advertisers may be included in an advertisement bidding process, in which advertisers may bid to have their advertisements presented to those users most likely to be receptive to those advertisements. As part of this bidding process, a limited number of selected advertisements from all advertisers may be presented to a user within a particular time period. Consequently, the advertisements from all advertisers that are selected for a particular user may be ranked according to one or more criteria, such as, for example, a bid amount offered by an advertiser to have its particular advertisements presented to the user. The media content device 102 may then rank the selected advertisements to determine which advertisements will actually be shown during that time period based on the bid amount, possibly in combination with other factors.

In response to executing the one or more selection applications, the media content device 102 may transfer an indication of the selected advertisements to the server 150 (operation 508) based on the advertisement catalog 218. In some examples, the indication of the selected advertisement may be a URL or other type of address for the advertising content. In response to receiving the advertisement selections, the server 150 may retrieve the selected advertisements (operation 510), such as from advertising content 320, and transfer the selected advertisements to the media content device 102 (operation 512). In response to receiving the selected advertisements, the media content device 102 may schedule and forward the selected advertisements for presentation to the user (operation 514), such as via one or more media presentation devices 104. In some examples, the transferred selected advertisements may also include VAST or similar information indicating one or more aspects of how the selected advertisements are to be presented to the user.

FIG. 6 is a flow diagram of example communications between the media content device 102 and the server 150 of FIG. 1 for the targeting of advertising to one or more users according to another embodiment. Similar to the example of FIG. 5, the server 150 may retrieve one or more selection applications for the media content device 102, possibly along with an advertisement catalog 318 (operation 602). In addition, the server 150 may retrieve one or more advertisements of advertising content 320, which, along with the retrieved selection applications and/or advertisement catalog 318, may be transferred to the media content device 102 (operation 604) over the WAN 160. Depending on the particular embodiment, some or all of the available advertisements from which particular advertisements are ultimately selected may be transferred to the media content device 102, which may then store the received advertisements as advertisement content 220. In some examples, the advertising content 320 may be pushed to the media content device 102 via a broadcast medium, such as satellite, cable, or terrestrial antenna connection, and/or by way of the wide area network 160. Further, the media content device 102 may store an advertising catalog 318 as advertising catalog 218, or may generate the advertising catalog 218 based on the advertising content 320 received from the server 150. In response to receiving the selection applications and the advertising content 320, possibly along with the advertising catalog 318, the media content device 102 may execute the one or more selection applications to select one or more advertisements (operation 606), and may schedule and forward the received and selected advertisements for presentation to the user (operation 614).

In both FIGS. 5 and 6, the media content device 102 performs the advertisement selection that is based on the user product information 214 accessed within the local network area 101 of FIG. 1. By virtue of the user product information 214, as well as any additional information 216 associated with the user, remaining within the local network area 101, a high level of security regarding that information may be maintained. In some examples, the user product information 214 and the additional information 216 may be encrypted as stored within the media content device 102 to further enhance the security of that information.

In the example of FIG. 7, the server 150 may be tasked primarily with the selection of advertisements, possibly along with the providing of the selected advertisements to the media content device 102. More specifically, as illustrated in FIG. 7, the media content device 102 may provide an indication of the user product information 214 (and possibly additional information 216) to the server 150 via the WAN 160 (operation 702). In one example, the user product information 214 may be encrypted prior to transfer to the server 150, or may be processed or transformed in some other way to reduce the probability of theft of the information over the WAN 160. In response to receiving the user product information 214 (operation 702), the server 150 may then select advertisements from stored advertising content 320 to be presented to the user of the content media device 102 (operation 706) based on the received user product information 214, which may be stored as user product information 314, as well as any received additional information 216 stored as additional information 316. The server 150 may then transfer the selected advertisements to the media content device 102 via the WAN 160 (operation 712), and the media content device 102 may then schedule and forward the received advertisements for presentation to the user (operation 714). In some embodiments, the server 150 may forward a URL or other address information for the selected advertisement to the media content device 102, and the media content device 102 may employ that address information to retrieve the selected advertisement from the server 150 or another system before scheduling and forwarding the received advertisements for user presentation. In other embodiments, the server 150 may push the selected advertisements via a cable, satellite, terrestrial antenna, or other broadcast content medium. In another example in which the media content device 102 has previously received the available advertisements from the server 150 (stored, for example, as advertising content 220), the server 150 may transfer to the user an indication of the selected advertisements to the media content device 102, upon which the media content device 102 may retrieve the selected advertisements from the advertising contents 220 for presentation to the user based on the received indication.

In at least some of the embodiments described above, in advertising distribution environments in which specific advertisements may be presented to individual users, by accessing and utilizing user product information associated with the user, advertisers may target particular advertisements to those users that may be more interested and receptive to those advertisements. This ability to target advertising may increase the efficiency of advertising budgets by allowing advertisers to direct advertising to those users more likely to respond positively to the advertisement. Such a response by the user may include requesting more information about the product or service that is the subject of the advertisement, or possibly purchasing that product or service. Additionally, in communication systems in which the advertiser determines to which users the advertisements are directed, control over the advertising process may be significantly enhanced. Moreover, by employing applications that determine which users receive which advertisements, and by executing those applications in either a server 150 associated with a service provider, or within a media content device 102 of the user, the advertiser maintains a significant amount of control over the advertising while personal information associated with the user, such as user product information 214 and any other user-specific information, may remain hidden from the advertiser and/or third parties.

Figure 8:
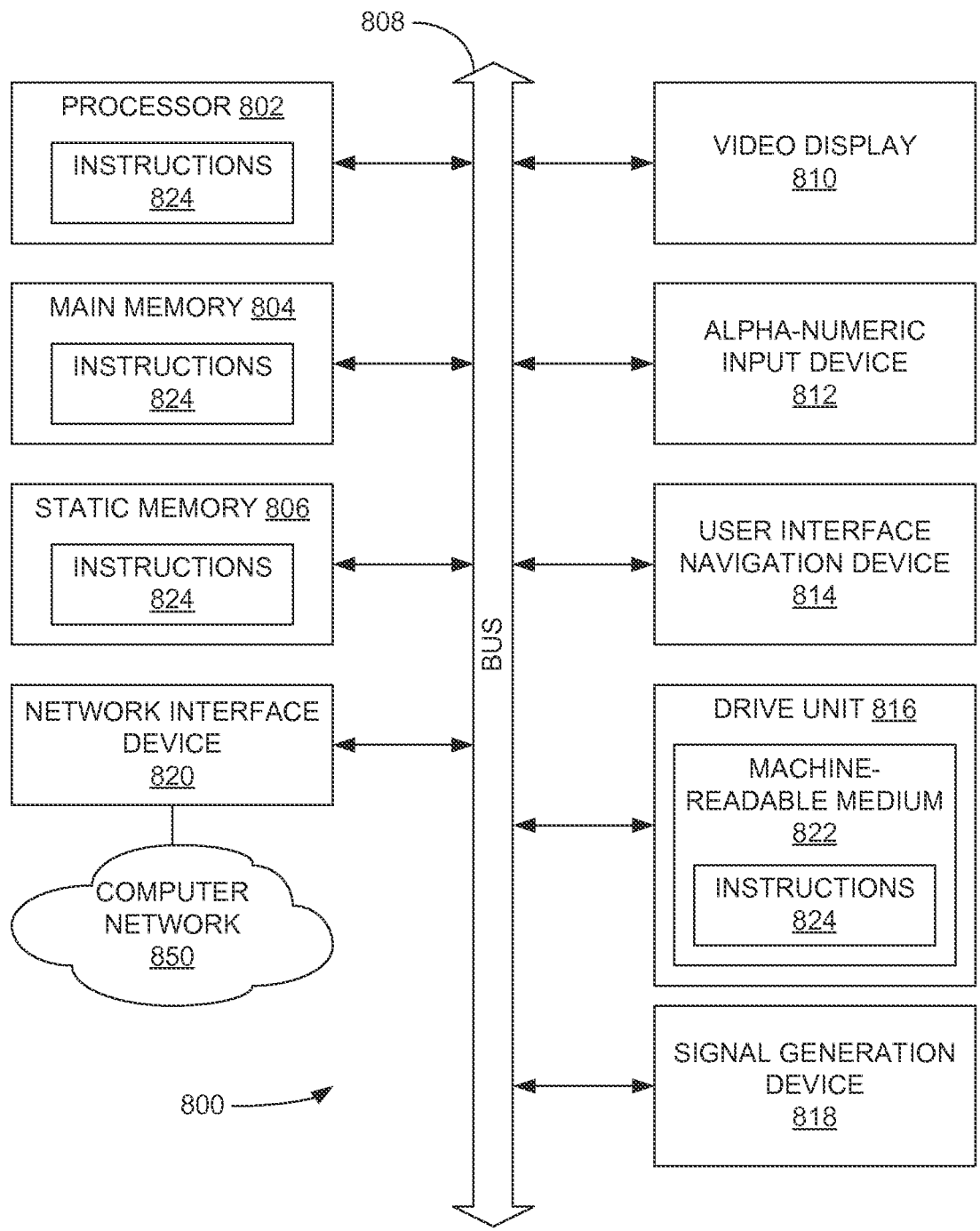
FIG. 8 is a diagrammatic representation of a machine in the example form of a computer system within which a set of instructions may be executed for causing the machine to perform any one or more of the methodologies discussed herein.

FIG. 8 illustrates a diagrammatic representation of a machine in the example form of a computer system 800 within which a set of instructions may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer, a tablet computer, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806 which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions and data structures (e.g., instructions 824) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

The instructions 824 may further be transmitted or received over a network 850 via the network interface device 820 utilizing any one of a number of well-known transfer protocols (e.g., HyperText Transfer Protocol (HTTP)).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions 824. The term "machine-readable medium" shall also be taken to include any medium that is capable of storing, encoding or carrying a set of instructions for execution by the machine and that cause the machine to perform any one or more of the methodologies of the present inventive subject matter, or that is capable of storing, encoding or carrying data structures utilized by or associated with such a set of instructions 824. The term "machine-readable medium" shall accordingly be taken to include, but not be limited to, solid-state memories, and optical and magnetic media.

Throughout this specification, plural instances may implement components, operations, or structures described as a single instance. Although individual operations of one or more methods are illustrated and described as separate operations, one or more of the individual operations may be performed concurrently, and the operations may be performed in an order other than that illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The Abstract of the Disclosure is provided to comply with 37 C.F.R. § 1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments include more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although embodiments of the present disclosure have been described with reference to specific example embodiments, it will be evident that various modifications and changes may be made to these embodiments without departing from the broader scope of these embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:
1. A method comprising:
receiving, by a media content device from a server via a wide area network, a selection application and a catalog of media content items;

accessing, by the media content device from an electronic device communicatively coupled to the media content device via a communication connection within a local network area served by the media content device, product information that describes at least one characteristic of the electronic device;

selecting, by the media content device using the received selection application, a media content item from the catalog of media content items based on the product information;

providing, by the media content device to the server via the wide area network, an indication of the selected media content item;

receiving, by the media content device from the server via the wide area network, the selected media content item; and forwarding, from the media content device, the selected media content item for presentation.

2. The method of claim 1, wherein the electronic device comprises a home appliance communicatively coupled to the media content device via a home automation network.

3. The method of claim 1, wherein the electronic device comprises a computing device communicatively coupled to the media content device via a local area network connection.

4. The method of claim 1, wherein the forwarding of the selected media content item comprises scheduling, at the media content device, the selected media content item among other media content being forwarded for presentation.

5. The method of claim 1, wherein the selecting of the media content item from the catalog of media content items comprises processing the product information with other information not originating from the electronic device.

6. The method of claim 5, further comprising:
accessing, by the media content device from another electronic device communicatively coupled to the media content device via the communication connection within the local network area served by the media content device, the other information.

7. The method of claim 1, wherein the electronic device comprises a home appliance, and wherein the product information comprises at least one of an age of the home appliance, a manufacturer of the home appliance, an operational state of the home appliance, and a status log of the home appliance.

8. The method of claim 1, wherein the product information comprises an indication of an error condition in the electronic device, and the selected media content item comprises information regarding resolution of the error condition.

9. The method of claim 1, wherein the product information comprises an indication of an operational status of the electronic device, and the selected media content item comprises information regarding recommended operation of the electronic device.

10. The method of claim 1, wherein the selected media content item comprises information regarding a recall of the electronic device.

11. The method of claim 1, further comprising:
receiving, by a media device via the communication connection within the local network area served by the media content device, the selected media content item forwarded from the media content device; and
presenting, by the media device, the received selected media content item.

12. The method of claim 1, wherein:
the selection application is a first selection application provided by a first media content provider;
the media content item is a first media content item;
the method further comprises:
receiving, by the media content device from the server via the wide area network, a second selection application provided by a second media content provider;
selecting, by the media content device using the received second selection application, a second media content item from the catalog of media content items based on the product information; and
ranking, by the media content device, the first media content item and the second media content item based on criteria for the first media content provider and the second media content provider; and
the forwarding of the first media content item is based on the ranking of the first media content item and the second media content item.

13. The method of claim 1, further comprising:
receiving, by the media content device from the server via the wide area network, information indicating an aspect of how the selected media content item is to be presented.

14. A non-transitory computer-readable storage medium comprising instructions that, when executed by at least one hardware processor of a media content device, cause the media content device to perform operations comprising:
receiving, from a server via a wide area network, a selection application and a catalog of media content items;
accessing, from an electronic device communicatively coupled to the media content device via a communication connection within a local network area served by the media content device, product information that describes at least one characteristic of the electronic device;
selecting, using the received selection application, a media content item from the catalog of media content items based on the product information;
providing, to the server via the wide area network, an indication of the selected media content item;
receiving, from the server via the wide area network, the selected media content item; and
forwarding the selected media content item for presentation.

15. The computer-readable storage medium of claim 14, wherein the electronic device comprises a home appliance communicatively coupled to the media content device via a home automation network.

16. The computer-readable storage medium of claim 14, wherein the electronic device comprises a computing device communicatively coupled to the media content device via a local area network connection.

17. A media content device configured to present media content, the media content device comprising:
one or more hardware processors; and
a memory storing instructions that, when executed by at least one of the one or more hardware processors, cause the media content device to perform operations comprising:
receiving, from a server via a wide area network, a selection application and a catalog of media content items;
accessing, from an electronic device communicatively coupled to the media content device via a communication connection within a local network area served by the media content device, product information that describes at least one characteristic of the electronic device;

selecting, using the received selection application, a media content item from the catalog of media content items based on the product information;

providing, to the server via the wide area network, an indication of the selected media content item;

receiving, from the server via the wide area network, the selected media content item; and forwarding the selected media content item for presentation.

18. The media content device of claim 17, wherein the media content device comprises at least one of a television set-top box, a media gateway, a computer, and a television.

19. The media content device of claim 17, wherein the media content device comprises at least one of a smart phone and a tablet computer.

* * * * *